(12) United States Patent
Gantman et al.

(10) Patent No.: US 8,046,587 B2
(45) Date of Patent: Oct. 25, 2011

(54) METHOD OFF-LINE AUTHENTICATION ON A LIMITED-RESOURCE DEVICE

(75) Inventors: Alexander Gantman, Poway, CA (US); Gregory G. Rose, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1250 days.

(21) Appl. No.: 11/609,299

(22) Filed: Dec. 11, 2006

(65) Prior Publication Data
US 2007/0234042 A1 Oct. 4, 2007

Related U.S. Application Data

(60) Provisional application No. 60/749,922, filed on Dec. 12, 2005.

(51) Int. Cl.
*G06F 21/00* (2006.01)
(52) U.S. Cl. ........ 713/182; 713/155; 713/156; 713/157; 713/170; 713/176; 380/270; 380/271; 380/277; 726/2; 726/3; 726/4; 726/5; 726/17; 726/18; 726/19
(58) Field of Classification Search .......... 380/270–271, 380/277; 713/155–157, 170, 176, 182; 726/2–5, 726/17–19
See application file for complete search history.

(56) References Cited

U.S. PATENT DOCUMENTS

| 5,887,250 | A | 3/1999 | Shah | |
| 7,409,543 | B1 * | 8/2008 | Bjorn | ............................. 713/155 |
| 2005/0193207 | A1 * | 9/2005 | Buck | ............................. 713/178 |

OTHER PUBLICATIONS

Potlapally et al. "Optimizing public-key encryption for wireless clients" ICC 2002. 2002 IEE International Conference on Communications. New York, NY Apr. 28-May 2, 2002. vol. 1 of 5. 7 pages.
International Search Report dated Nov. 22, 2007 for PCT Application Serial No. PCT/US2006/061958, 3 Pages.
International Preliminary Report on Patentability, PCT/US06/061958, The International Bureau of WIPO, Geneva, Switzerland, Jun. 18, 2008.
Written Opinion, PCT/US06/061958, International Search Authority, European Patent Office, Nov. 22, 2007.
European Office Action dated Nov. 25, 2009, for European Patent Application Serial No. 06850279.8, 3 pages.
Korean Office Action dated Mar. 29, 2010, for Korean Patent Application Serial No. 2008-7016775, 3 pages.

* cited by examiner

*Primary Examiner* — Thanhnga B Truong
(74) *Attorney, Agent, or Firm* — Turocy & Watson, LLP (57) ABSTRACT

One feature provides a method for granting authenticated access to off-line, limited-resource mobile devices. A public-private key pair is generated by a service provider and the public key is used to digitally sign a username and (possibly) access privileges to obtain a password for technician. The public key is securely distributed to mobile devices. When off-line, a mobile device may authenticate access to restricted functions of the mobile device by a technician. The technician provides its username, access privileges and password to the mobile device. The mobile device then uses the public key, username and access privileges to verify the password. To invalidate an old username and password, the service provider replaces the public-private key pair with a new public-private key pair.

14 Claims, 4 Drawing Sheets

METHOD OFF-LINE AUTHENTICATION ON A LIMITED-RESOURCE DEVICE

CLAIM OF PRIORITY UNDER 35 U.S.C. §119

The present Application for Patent claims priority to U.S. Provisional Application No. 60/749,922 entitled "Method for Off-Line Authentication on a Limited-Resource Device" filed Dec. 12, 2005, and assigned to the assignee hereof and hereby expressly incorporated by reference herein.

BACKGROUND

1. Field

Various examples relate generally to device authentication and more particularly to off-line authentication of limited resource devices.

2. Background

Public-key cryptography systems are implemented in devices, including portable devices, to enhance data security and generate cryptographic signatures that can be employed in connection with device and/or user authentication. Public-key cryptography systems provide a user with a private key and a public key for authentication purposes, wherein the public key is shared with disparate users and/or devices while the private key is concealed to all except an assigned user and/or device. In more detail, if the user and/or device requests access to a disparate device, the public key can be delivered to one or more targeted entities while the private key is retained within the device and concealed from the device to which access is requested. In this manner, the device can be utilized by an owner thereof to establish relationships with targeted entities, thus providing the owner access to secured items, including doors, bank accounts, computer networks, etc.

When a service technician desires access to mobile devices for servicing purposes, a short service programming code (SPC) typically common to all devices on a service provider's network is utilized. An SPC is a secret number that allows reprogramming of user information and is employed to prevent companies, other than the original sales company, from having the ability to program the device. Technicians employed by the service provider, however, utilize the code to access and program a mobile device, causing issues with respect to security, as there is no method of revoking the service programming code. It is not practicable to provide every service technician a conventional username and password, to overcome security concerns, as providing a unique username and password may require hundreds or thousands of username-password pairs to be provisioned on every device. In the case of limited resource devices, this is not possible due to the limited resources.

Hence, it would be desirable to have a method or device for granting authenticated access to off-line, limited-resource mobile devices.

SUMMARY

A method operational on a mobile device is provided for authenticating off-line access to the mobile device. A public key associated with a service provider for the mobile device is obtained, wherein the public key has a corresponding private key and the public key and private key are used for asymmetric cryptography. The public key is stored for authenticating access requests when the mobile device is off-line. An access request is received to restricted functions of the mobile device while the mobile device is off-line, wherein the access request includes username, an access privilege, and a password, the password derived from the username and access privilege digitally signed by the private key. The access request is authenticated by using the public key to validate the password. The requested access is denied if the validation is unsuccessful. The requested access is granted if the validation is successful. The password may be a message authentication code of the username and access privilege signed by the private key. The username, access privilege, and password may be manually inputted into the mobile device. The username, access privilege, and password may be inputted via another device coupled to the mobile device. A second public key associated with the service provider may be received and the public key is replaced with the second public key for off-line authentication. An access request is denied if a received password was generated using a different key than the second public key.

A mobile device is also provided comprising a communication component, a storage device, and a processor. The communication component may be configured to receive a public key associated with a service provider for the mobile device, wherein the public key has a corresponding private key and the public key and private key are used for asymmetric cryptography. The storage device may store the public key for authenticating access requests when the mobile device is off-line. The processor may be configured to (a) receive an access request to restricted functions of the mobile device while the mobile device is off-line, wherein the access request includes username, an access privilege, and a password, the password derived from the username and access privilege digitally signed by the private key, (b) authenticate the access request by using the public key to validate the password, (c) deny the requested access if the validation is unsuccessful, and (d) grant the requested access if the validation is successful.

The processor may be further configured to (a) receive a second public key associated with the service provider, wherein the second public key has a corresponding second private key, (b) replace the public key with the second public key for off-line authentication, and (c) deny an access request if a received password was generated using a different key than the second private key.

A machine-readable medium is also provided having one or more instructions for authenticating off-line access to a mobile device, which when executed by a processor causes the processor to: (a) obtain a public key associated with a service provider for the mobile device, wherein the public key has a corresponding private key and the public key and private key are used for asymmetric cryptography, (b) store the public key for authenticating access requests when the mobile device is off-line, (c) receive an access request to restricted functions of the mobile device while the mobile device is off-line, wherein the access request includes username, an access privilege, and a password, the password derived from the username and access privilege digitally signed by the private key, (d) authenticate the access request by using the public key to validate the password, (e) deny the requested access if the validation is unsuccessful, and/or (f) grant the requested access if the validation is successful.

A method is also provided for facilitating off-line access authentication to user mobile devices. A public-private key pair associated with a service provider is generated. The public key is distributed to the user mobile devices. A username is created for a technician associated with the service provider. An access privilege is associated with the username. A password associated with the technician is generated by digitally signing the username and access privilege with the private key. The password may be a message authentication code of the username and access privilege signed by the private key.

The public-private key pair may be replaced with a new public-private key pair. In such case, a new password may be generated for the username based on the new private key. The new public key is then distributed to the user mobile devices.

A server device is also provided comprising a communication module and a process. The communication module may communicate with one or more user mobile devices. The processor may be configured to (a) generate a public-private key pair associated with a service provider; (b) distribute the public key to the user mobile devices through the communication module; (c) create a username for a technician associated with the service provider; (d) associate an access privilege with the username; and/or (e) generate a password associated with the technician by digitally signing the username and access privilege with the private key.

The processor may be further configured to (a) generate a new public-private key pair to replace the public-private key pair; (b) generate a new password for the username based on the new private key, and/or (c) distribute the new public key to the one or more user mobile devices over the communication module.

A machine-readable medium is also provided having one or more instructions for facilitating off-line authentication by a mobile device, which when executed by a processor causes the processor to: (a) generate a public-private key pair associated with a service provider; (b) distribute the public key to the user mobile devices through the communication module; (c) create a username for a technician associated with the service provider; (d) associate an access privilege with the username; and/or (e) generate a password associated with the technician by digitally signing the username and access privilege with the private key.

DETAILED DESCRIPTION

In the following description, specific details are given to provide a thorough understanding of the examples. However, it will be understood by one of ordinary skill in the art that the examples may be practiced without these specific details. For example, circuits may not be shown in block diagrams in order not to obscure the examples in unnecessary detail.

Also, it is noted that the examples may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, a storage medium may represent one or more devices for storing data, including read-only memory (ROM), random access memory (RAM), magnetic disk storage mediums, optical storage mediums, flash memory devices, and/or other machine readable mediums for storing information. The term "machine readable medium" includes, but is not limited to, portable or fixed storage devices, optical storage devices, wireless channels, and various other mediums capable of storing, containing, or carrying instruction(s) and/or data.

Furthermore, various configurations may be implemented by hardware, software, firmware, middleware, microcode, or a combination thereof. When implemented in software, firmware, middleware, or microcode, the program code or code segments to perform the described tasks may be stored in a machine-readable medium such as a storage medium or other storage means. A processor may perform the defined tasks. A code segment may represent a procedure, a function, a subprogram, a program, a routine, a subroutine, a module, a software package, a class, or a combination of instructions, data structures, or program statements. A code segment may be coupled to another code segment or a hardware circuit by passing and/or receiving information, data, arguments, parameters, or memory contents. Information, arguments, parameters, data, and the like, may be passed, forwarded, or transmitted via a suitable means including memory sharing, message passing, token passing, and network transmission, among others. The methods disclosed herein may be implemented in hardware, software, or both.

The various illustrative logical blocks, modules, circuits, elements, and/or components described in connection with the example disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combinations thereof designed to perform the functions described herein. A general purpose processor may be a microprocessor, but in the alternative, the processor may be any conventional processor, controller, microcontroller, or state machine. A processor may also be implemented as a combination of computing components, e.g., a combination of a DSP and a microprocessor, a number of microprocessors, one or more microprocessors in conjunction with a DSP core, or any other such configuration.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

One feature provides a method for granting authenticated access to off-line, limited-resource mobile devices. An asymmetric cryptography public-private key pair is generated by a service provider. The private key is used by a service provider to digitally sign a username and (possibly) access privileges to obtain a password for technician. The username, access privileges, and password being associated with the technician. The public key is securely distributed to mobile devices. When off-line, a mobile device may authenticate access requests to restricted functions of the mobile device by a technician. The technician provides its username, access privileges and password to the mobile device. The mobile device then uses the public key to authenticate the password. To invalidate an old username and password, the service provider replaces the public-private key pair with a new public-private key pair. This change in keys may also cause the technician passwords to change. However, through this approach, a limited-resource device need not store usernames, access privileges, and/or passwords internally and the service provider can invalidate old usernames and passwords.

In conventional systems, a service provider provides its service technician(s) with a code, known as a short service programming code (SPC), which allows its service technician(s) to reprogram user information in a mobile device. The SPC is a secret number that is common to devices on a service provider's network and is employed to prevent other entities from reprogramming the mobile device. However, there is no effective method of revoking the SPC, thus, there may be hundreds, if not thousands, of service technicians that are aware of the SPC, and retain knowledge of the SPC even after they are no longer employed by the service provider. Security of a device and/or network can then be compromised, as each technician utilizes the SPC to perform service functions, but service provider can have difficulties preventing dissemination of the SPC if it becomes known to an entity intending to exploit such SPC and/or compromise mobile devices.

In yet other conventional systems, the service provider may disseminate to each mobile device a list of usernames and passwords for its technicians. However, limited-resource mobile devices may not have the storage capabilities to store large amounts of usernames and/or passwords. Furthermore, replacement or invalidation of a particular username and password may require changing the information in every mobile device.

Figure 1:
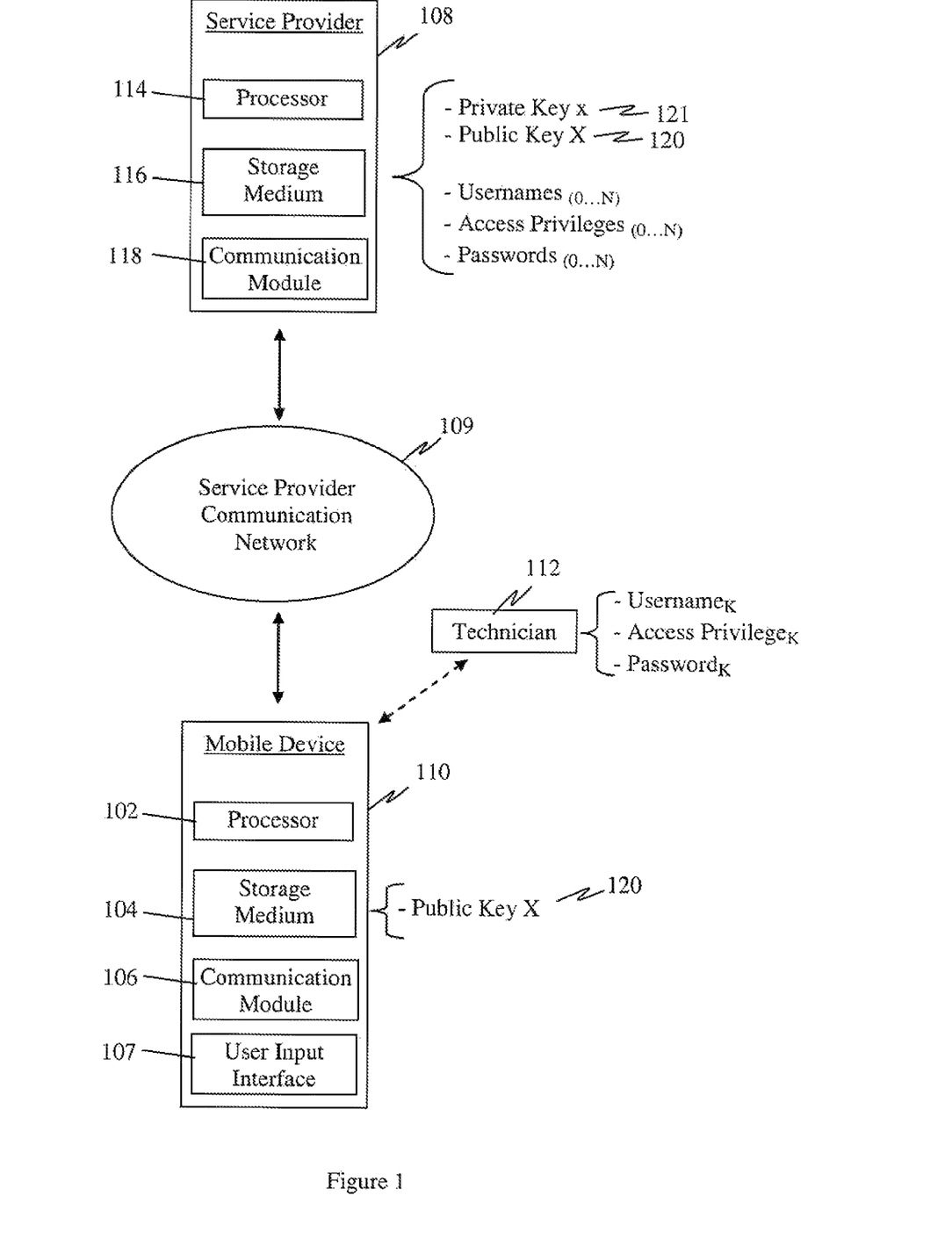
FIG. 1 illustrates a block diagram of an authentication scheme that may facilitate off-line authentication by a mobile device.

FIG. 1 illustrates a block diagram of an authentication scheme that may facilitate off-line authentication by a mobile device. A mobile device 110 includes a processor 102, a storage medium 104 and a communication component 106. Mobile device 110 may be a portable phone, a personal data assistant, a computer (desktop or laptop), and/or may be part of a larger device, such as part of an automobile or security system, and/or other electronic devices. Processor 102 may be configured to create and/or manipulate cryptographic keys and/or access data relating to a user's privileges as defined by a service provider 108. Storage medium 104 may store data relating to a user device as well as a public key of the service provider 108, cryptographic keys created and manipulated by processor 102, and other suitable data that can be utilized in conjunction with mobile device 110. Communication component 106 may receive and/or send data over a communication network 109 associated with the service provider 108. The data sent and/or received may include voice and/or video data, data relating to cryptographic keys, computer-related data, etc. Moreover, a user imputer interface 107, may allow entering information (e.g., usernames, access privileges, and/or passwords), manually or otherwise, into the mobile device 110.

The service provider 108 may be a provider of services for mobile devices (e.g., wireless telephone service provider, device manufacturer, technical services provider, etc.). In this example, the service provider 108 may be a computing device or server including a processor 114, a storage medium, and a communication module 118.

To more efficiently mitigate unauthorized access and/or reprogramming of mobile device 110, public key cryptography may be utilized between service provider 108 and mobile device 110.

A public key X 120 associated with the service provider 108 may be known by the service provider 108 and its mobile devices 110. This public key X 120 may be distributed to mobile device 110 when services are setup by service provider 108. The service provider 108 may also generate usernames and passwords associated with its technicians or authorized personnel. The access privilege (e.g., rules, use restrictions, expiration dates, etc.) for each technician may also be defined.

The username may be a suitable combination of alpha, numeric, or alpha-numeric characters issued by service provider 108 or it can be a name chosen by the technician and confirmed by service provider 108. The password may be a signature of the username and include access or use rules associated with such technician. The access privileges may include restrictions, such as start and end validity times. For example, the access privileges associated with a particular technician's username may only allow access from January 31 to June 13. Thus, the technician 112 can only obtain access to restricted functions of mobile device 110 during this validity period. After such time, mobile device 110 may be updated with a different validity period, if applicable.

The username, access privileges, and password allow a technician 112 to gain access to restricted functions of mobile device 110 even if the mobile device 110 is unable to communicate with service provider 108, such as if device 110 is in an off-line condition due to system failure, device failure, lack of wired or wireless network link, or other interruptions in communication.

In one example, for a particular technician 112, having a username$_K$ and associated access privilege$_K$, a password$_K$ may be based on the username$_K$ and associated rules$_K$. By way of illustration, a message-authentication code (MAC) may be used to generate the password$_K$ for a technician, where the MAC is based on the username and access privilege (for the particular technician) signed with the private key x 121, $$Password_K = MAC_x(Username_K, Rules_K).$$

When a technician 112 requests access to mobile device 110, the technician 112 provides a username$_K$ and a level of access (access privilege$_K$) to the mobile device 110. Additionally, the technician provides its password$_K$ to the mobile device 110. The mobile device 110 may validate or authenticate the password$_K$ by using the public key X 120. If the password$_K$ is successfully authenticated, the technician is granted the requested access privileges to the mobile device 110. However, if it is not authenticated, then access is denied.

Allowing access verification through the public key X 120 mitigates the necessity of service programming codes (SPCs). The use of the public key X 120 to authenticate a technician's password allows mobile device 110 to authenticate a virtually infinite number of technicians or users with the single public key 120 associated with service provider 110, which is possible regardless of the processing or memory capabilities of mobile device 110.

Additionally, because using the MACx of username$_K$ and access privilege$_K$ may generate a rather long number, the MACx may be truncated to provide a password$_K$ that is just a few characters long. For example, the last n digits of the MACx (username$_K$ and access privilege$_K$) may be utilized as the password$_K$. In this manner, the password$_K$ is sufficiently short to allow a technician to remember it.

Figure 2:
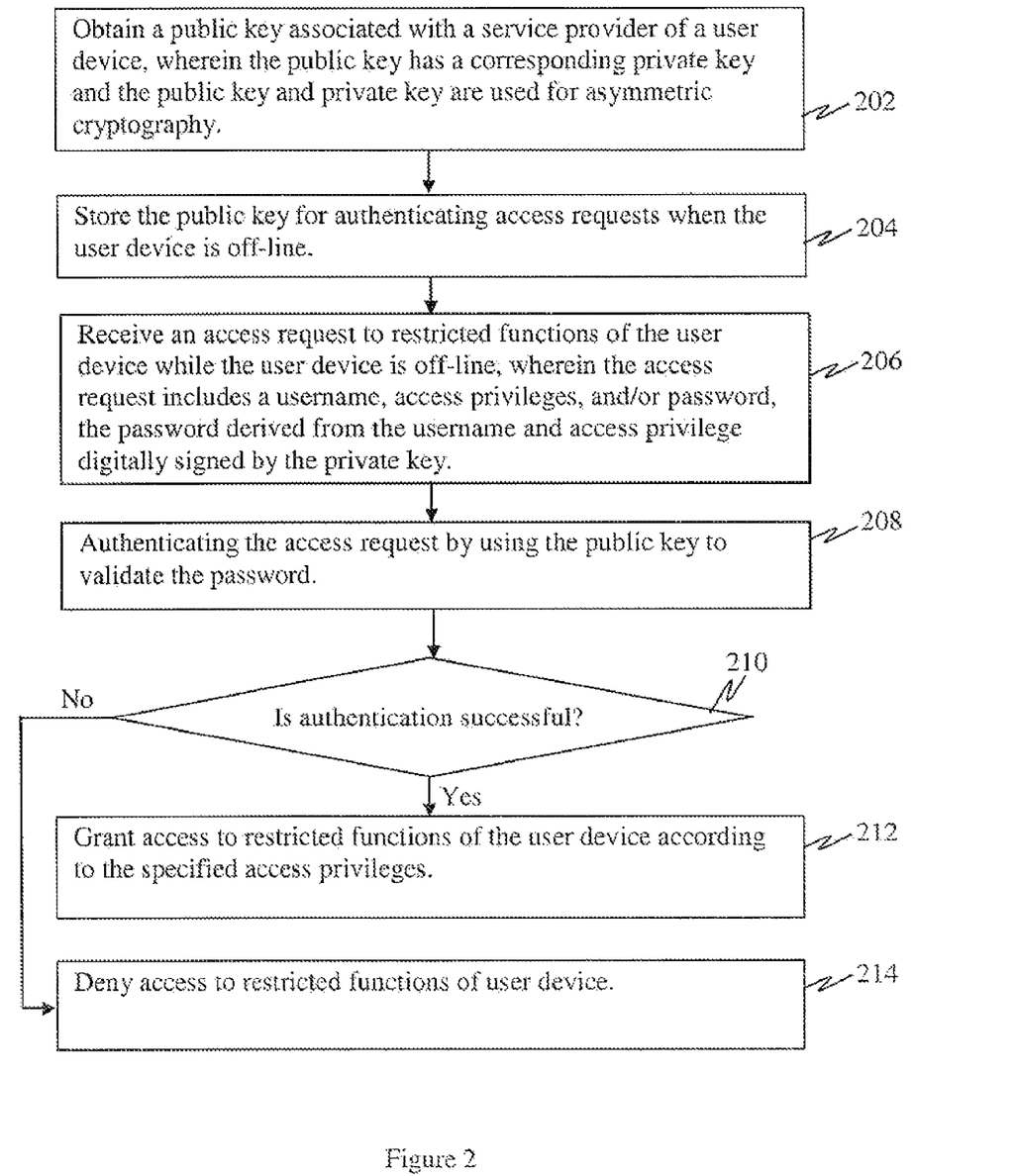
FIG. 2 illustrates a method operational on a user device for authenticating an off-line, limited-resource device according to one example.

FIG. 2 illustrates a method operational on a user device for authenticating an off-line, limited-resource device according to one example. A public key associated with a service provider is received or obtained by the user device, wherein the public key has a corresponding private key and the public key and private key are used for asymmetric cryptography 202. The user device may be a mobile device, such as a mobile phone, a personal data assistant, a computer, or other electronic devices. The public key may be communicated to the user device before it is in possession of a user or it can be input at a later time, such as when the service provider has later access to the device. For example, a service provider may have access to the user device when the user device is first put into use and associated with a particular user. A service provider may also have access to the user device each time the user communicates with or accesses the services of such provider e.g. uses a mobile phone to communicate with other mobile phone users. When the user device is in use, the service provider can receive data from the user device and send data to the user device. In this way, the service provider is able to communicate the public key to the device at any time, and can update the public key with new or replacement public keys on an as needed basis. The public key is stored for authenticating access requests when the user device is off-line 204.

When the user device is in need of service, it may be off-line, e.g., communication with a server and/or computer of the service provider is not possible. This can be caused by the user device not functioning property, a network failure, or the like. In these off-line situations, a technician should still be capable of accessing and authenticating the user device so that the device is returned to its operating condition. While the user device is off-line, it may receive an access request to restricted functions of the user device, wherein the access request may include a username, access privileges, and/or password associated with the requesting technician, the password derived from the username and access privilege digitally signed by the private key 206. The password received may be based on the username and access privileges digitally signed by the service provider's private key. The username, access privileges, and/or password may be entered through various types of user interfaces. For example, the service technician may use a keypad on the user device to manually enter the username, access privileges, and/or password. Alternatively, a service device may be physically or wirelessly coupled to the user device and used to provide the username and/or password to the user device. For example, the service unit may be a portable phone, a personal data assistant, a computer, or other electrical devices. The username may be a random number issued by the service provider and each technician can have a unique username for identification purposes. The password may be a signature of the username with access privileges under the service provider's private key. The access privileges may include optional parameters, such as expiration date, policies, rules, etc.

The user device then authenticates the access request by using the public key to validate the password 208. In this manner, the user device is capable of authenticating a large number of users (e.g., technicians) with a single public key. If authentication is successful 210 (e.g., the public key authenticates the password), access is granted to restricted functions of the user device according to the specified access privileges 212. This may allow the technician to reprogram or service the user device, as needed. Otherwise, if authentication fails 210 (e.g., the password are not authenticated by the service provider's public key), the user device denies access to its restricted functions 214.

In one example, the access privileges may allow a technician access to user devices within a certain range or geographic area, or only permit access to devices within a certain range of serial numbers and/or model numbers. In another configuration, the access privileges or rules may be associated with a validity period, having a start time and an end time, for example. The access privileges or rules are verified by ensuring that the validity period has started but has not yet ended. If the access privileges or rules are valid, the technician is able to service the user device to bring the device up-to-date or to restore the device to working order.

Figure 3:
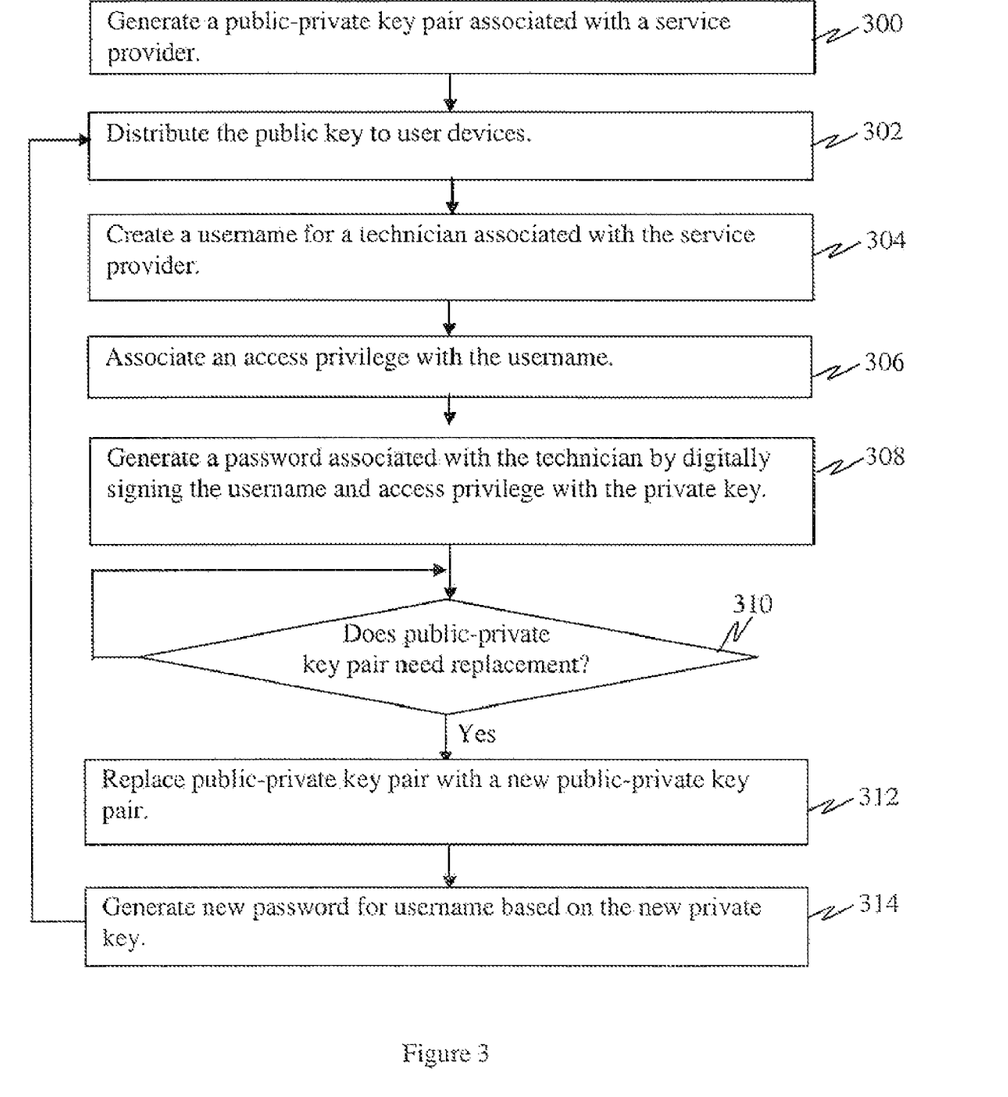
FIG. 3 illustrates a method operational by service provider for granting access to restricted functions of an off-line user device.

FIG. 3 illustrates a method operational by service provider for granting access to restricted functions of an off-line user device. A public-private key pair associated with a service provider is generated 300 and the public key is distributed (via secure method) to user devices 302. A username is created for a technician associated with the service provider 304. An access privilege is associated with the username 306. A password associated with the technician is generated by digitally signing the username and access privilege with the private key 308. For example, the password may be a truncated version of a message authentication code for the username and access privilege signed with the private key.

The service provider may, from time to time, determine whether the public-private key pair should be replaced 310. For example, replacing the public-private key pair with a new public-private key pair 312 will prevent users with old/expired usernames and passwords from gaining access to mobile devices. That is, by generating a new public-private key pair and securely distributing it to user mobile device, old usernames and passwords will not be authenticated properly by the user devices. The service provider generates new passwords for its usernames based on the new private key 314. The new public key may be distributed when the user mobile device comes online or otherwise communicates with the service provider.

Figure 4:
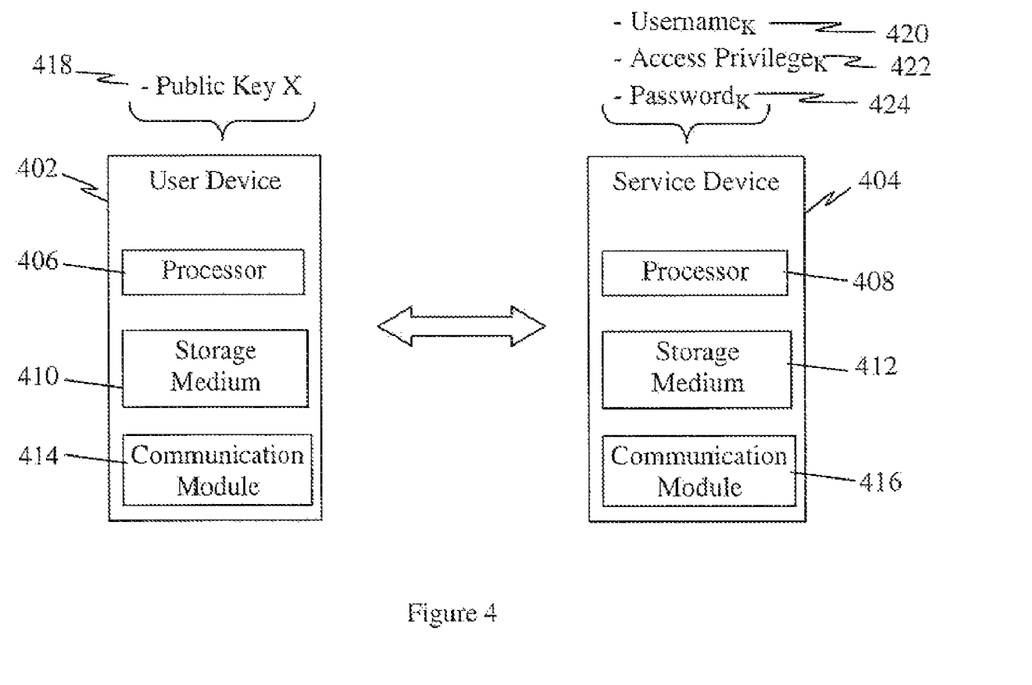
FIG. 4 is a block diagram of an alternative off-line authentication scheme that includes a user device and a service device.

FIG. 4 is a block diagram of an alternative off-line authentication scheme that includes a user device 402 and a service device 404. User device 402 and service device 404 may be mobile devices, such as mobile phones, personal data assistants, or other electronic devices. For illustration purposes, and not limitations, user device 402 and service device 404 are described with reference to mobile phones. However, it will be appreciated by those skilled in the art that other combinations of electronic devices can be utilized according to the one or more configurations described herein. For example, user device 402 may be a mobile phone and service device 404 may be a personal computer, or user device 402 may be a personal data assistant and service device 404 may be a portable phone. Thus, the configuration(s) are not limited to two devices of the same type and any combination of devices can be employed to authenticate a device.

User device 402 and service device 404 include respective processors 406 and 408 that can manipulate and create public-private key pairs as well as performing other processing functions relating to devices 402 and 404. Also included on devices 402 and 404 are storage mediums 410 and 412. The user storage medium 410 may store a public key X used to authenticate service technicians. The service device storage medium 412 may store a username$_K$ 420, access privilege$_K$ 422, and/or password$_K$ 424 associated with a technician. Further included are communication components 414 and 416 that provide a way for devices 402 and 404 to communicate with each other and with other suitable devices, such as a service provider, mobile phones, personal data assistants, computers, and other electronic devices.

If user device 402 needs servicing because it is not working properly, a service technician may provide service by utilizing a service device 404 to obtain access to the user device 402. This service can be provided regardless of whether one or both devices 402 and 404 are off-line, or not in communication with a service network. It is to be understood by those skilled in the art that the service can be provided if one or both devices 402 and 404 are on-off, or in communication with the service network.

When user device 402 is not functioning, a service technician may need to reprogram the user device 402 or enter a menu, such as a secret menu, on such user device 402 to restore the user device 402 to proper working order. This access should be available while protecting and maintaining the integrity and security of the user device 402. In some circumstances, the user device 402 may need servicing when there is no connection to a service provider or local service network. If the user device 402 is a limited resource device, it is not feasible to store every technician's username and password on such device because the resources should be saved to allow the device to operate. Thus, authorizing access and authenticating a service device 404 should be accomplished without wasting the limited resources of the user device 402.

User device 402 may include a public key 418 associated with a service provider and can be stored in storage medium 410, for example. The access privileges may be unique to a particular device and/or user and further protects the integrity of the user device 402 by not allowing unauthorized access to the user device 402.

A service provider may generate the password 424 for a technician by digitally signing the username and access privilege with a private key x corresponding to public key X 418. For example, a MAC may be employed such that, $$\text{Password}=\text{MAC}_x \text{ (Username}_K, \text{Access Privileges}_K)$$

To access an off-line user device 402, service technician may utilize a service device 404 (e.g., computer, mobile phone, personal digital assistant, . . . ) which may be off-line or on-line. Service device 404 can be connected to user device 402 through a physical hardwired connection or a wireless connection. User device 402, through an interaction with service device 404, allows the technician to enter a username 420, password 424, and/or access privilege 422. The username 420 may be a random name and/or number issued by the service provider. For example, the username 420 may be the actual name of the technician, an employee number, etc., and can be any combination of alpha, numeric, or alphanumeric characters and various algorithms, methods, and/or techniques can be employed to issue a unique username to each technician. The service technician may input the username 420 in service device 404 through any suitable means, such as a keypad, a pin pad, a keyboard, a pen and/or voice activation, for example.

A user password 424 may include a signature of the username 420 under the provider's private key x and may include access privileges 422. An example of an access privilege may include a validity period having an expiration data. The validity period can be periodically updated to ensure the user is an authentic user and to mitigate the occurrence of a user having access to devices for an indefinite period. For example, the username/password combination may expire every ninety days and before or at a substantially similar time as the expiry of the validity period, the username/password combination can be updated, changed, and/or renewed to allow continuous access for that particular user. Thus, if a technician is no longer employed by service provider, the technician's potential access to user devices can limited to ninety days or less depending on the frequency of username/password renewal. It should be appreciated that any criteria may be used to limit unauthorized access and time is utilized for illustration purposes only.

Once the technician has logged onto service device 404, it provides the username 420, access privilege 422, and password 424 for the technician to user device 402. This allows the user device 402 to authenticate the service device 404 and/or technician, allowing the technician privileged access to user device 202. For example, if the associated access privileges 422 provide a date restriction specifying an access period, the verification includes determining that the access period has begun and has not expired.

User device 402 verifies the authentication of the sign-on information by analyzing the username, access privileges, and password. If it is determined that there is a successful authentication, user device 402 is able to be accessed by the technician through the service device 404. The technician is then able to reprogram user device 402 and perform other service functions on user device 402 even in the absence of online communication with the service provider network.

Figure 5:
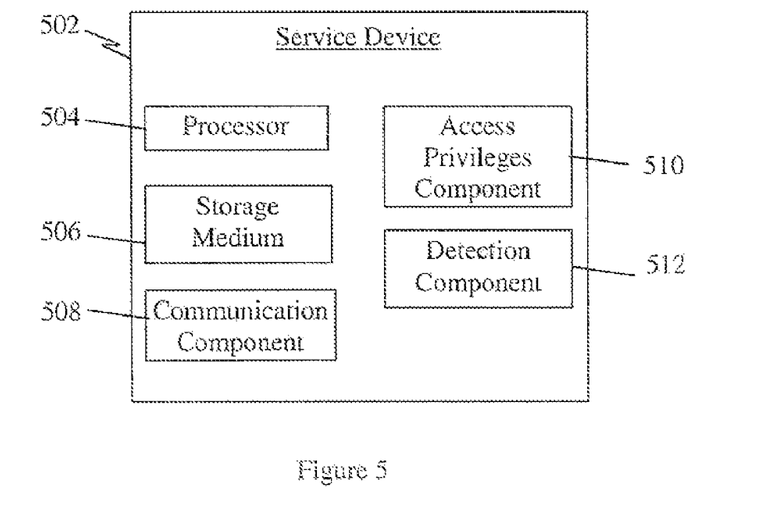
FIG. 5 illustrates a service device configured to facilitate off-line authentication.

FIG. 5 illustrates a service device 502 configured to facilitate off-line authentication. Service device 502 may be utilized for gaining access to a user mobile device (not shown) that may be off-line when authentication is attempted. Service device 502 includes a processor 504 that creates and/or manipulates cryptographic keys, a storage medium 506 that stores a private key associated with the device 502, and a communication component 508 that provides means for device 502 to communicate with other devices, service providers, etc. Service device 502 further includes an access privileges component 510 that contains rules associated with user access rights to the device and a detection component 512 that detects access activity on service device 502.

Access privileges component 510 may maintain information regarding rules, policies, restrictions, etc. associated with a user. For example, access privileges component 510 may include a data or look-up table that employs a listing of devices that can be accessed by that particular service device 502. For example, access privileges component 510 can have associated rules that allow authentication to devices within a specific range of serial number(s), model number(s), and/or other identifying criteria. Rules component 510 can include a device range that only allows device 502 to access other devices within a certain range, geographic area, etc.

Detection component 512 may provide information concerning the access activity of service device 502. When service device 502 communicates with a user mobile device (not shown), for servicing and/or programming, information regarding the user mobile device may be communicated to service device 502. In such a way, the user or technician is able to diagnose the user mobile device, even if both devices are off-line. Detection component 512 may allow user/technician access to a secret menu of the user mobile device being serviced. Further, detection component 512 may provide a mechanism by which the technician can modify parameters, systems, and/or operating characteristics of the device being serviced by inputting such change(s) into service device 502. Such modifications are communicated to the device being serviced and that device can be automatically updated with the modified information.

One or more of the components, steps, and/or functions illustrated in FIGS. 1-5 may be rearranged and/or combined into a single component, step, or function or device in several components, steps, or functions without departing from the invention. Additional elements, components, steps, and/or functions may also be added without departing from the invention. The apparatus, devices, and/or components illustrated in FIGS. 1, 2 and 5 may be configured to perform one or more of the methods, features, or steps described in FIGS. 2 and/or 3.

Those of skill would further appreciate that the various illustrative logical blocks, modules, circuits, and algorithm steps described in connection with the examples disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

It should be noted that the foregoing configurations are merely examples and are not to be construed as limiting the invention. The description of these examples is intended to be illustrative, and not to limit the scope of the claims. As such, the present teachings can be readily applied to other types of apparatuses and many alternatives, modifications, and variations will be apparent to those skilled in the art.

What is claimed is:

1. A method operational on a mobile device for authenticating off-line access to the mobile device, comprising:
    obtaining a public key associated with a service provider for the mobile device, wherein the public key has a corresponding private key and the public key and private key are used for asymmetric cryptography;
    storing the public key for authenticating access requests when the mobile device is off-line;
    receiving an access request to restricted functions of the mobile device while the mobile device is off-line, wherein the access request includes username, an access privilege, and a password, the password derived from the username and access privilege digitally signed by the private key; and
    authenticating the access request by using the public key to validate the password;
    wherein the password is a message authentication code of the username and access privilege signed by the private key.

2. The method of claim 1, further comprising:
    denying the requested access if the validation is unsuccessful; and
    granting the requested access if the validation is successful.

3. The method of claim 1, wherein the username, access privilege, and password are manually inputted into the mobile device.

4. The method of claim 1, wherein the username, access privilege, and password are inputted via another device coupled to the mobile device.

5. The method of claim 1, further comprising:
    receiving a second public key associated with the service provider; and
    replacing the public key with the second public key for off-line authentication.

6. The method of claim 5, further comprising:
    denying an access request if a received password was generated using a different key than the second public key.

7. A mobile device comprising:
    means for obtaining a public key associated with a service provider for the mobile device, wherein the public key has a corresponding private key and the public key and private key are used for asymmetric cryptography;
    means for storing the public key for authenticating access requests when the mobile device is off-line;
    means for receiving an access request to restricted functions of the mobile device while the mobile device is off-line, wherein the access request includes username, an access privilege, and a password, the password derived from the username and access privilege digitally signed by the private key; and
    means for authenticating the access request by using the public key to validate the password;
    wherein the password is a message authentication code of the username and access privilege signed by the private key.

8. The device of claim 7, further comprising:
    means for denying the requested access if the validation is unsuccessful; and
    means for granting the requested access if the validation is successful.

9. The device of claim 7, further comprising:
    means for receiving a second public key associated with the service provider, wherein the second public key has a corresponding second private key;
    means for replacing the public key with the second public key for off-line authentication; and
    means for denying an access request if a received password was generated using a different key than the second private key.

10. A mobile device, comprising:
    a communication component for receiving a public key associated with a service provider for the mobile device, wherein the public key has a corresponding private key and the public key and private key are used for asymmetric cryptography;
    a storage device coupled to the communication module, the storage device for storing the public key for authentication access requests when the mobile device is off-line; and
    a processor coupled to the storage device and communication module, the processor configured to receive an access request to restricted functions of the mobile device while the mobile device is off-line, wherein the access request includes username, an access privilege, and a password, the password derived from the username and access privilege digitally signed by the private key, and authenticate the access request by using the public key to validate the password;
    wherein the password is a message authentication code of the username and access privilege signed by the private key.

11. The device of claim 10, wherein the processor is further configured to:
    deny the requested access if the validation is unsuccessful; and
    grant the requested access if the validation is successful.

12. The device of claim 10, wherein the processor is further configured to:
    receive a second public key associated with the service provider, wherein the second public key has a corresponding second private key;
    replace the public key with the second public key for off-line authentication; and
    deny an access request if a received password was generated using a different key than the second private key.

13. A machine-readable medium having one or more instructions for authenticating off-line access to a mobile device, which when executed by a processor causes the processor to:

obtain a public key associated with a service provider for the mobile device, wherein the public key has a corresponding private key and the public key and private key are used for asymmetric cryptography;

store the public key for authenticating access requests when the mobile device is off-line; receive an access request to restricted functions of the mobile device while the mobile device is off-line, wherein the access request includes username, an access privilege, and a password, the password derived from the username and access privilege digitally signed by the private key; and authenticate the access request by using the public key to validate the password;

wherein the password is a message authentication code of the username and access privilege signed by the private key.

14. The machine-readable medium of claim 13 having one or more instructions which when executed by a processor causes the processor to further:

deny the requested access if the validation is unsuccessful; and grant the requested access if the validation is successful.

* * * * *